(12) United States Patent
Shintaku et al.

(10) Patent No.: US 10,042,191 B2
(45) Date of Patent: Aug. 7, 2018

(54) OPTICAL TRANSMITTER

(71) Applicant: Mitsubishi Electric Corporation, Chiyoda-ku (JP)

(72) Inventors: Hiroaki Shintaku, Chiyoda-ku (JP); Kentaro Enoki, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/534,817

(22) PCT Filed: Dec. 11, 2014

(86) PCT No.: PCT/JP2014/082825
§ 371 (c)(1),
(2) Date: Jun. 9, 2017

(87) PCT Pub. No.: WO2016/092666
PCT Pub. Date: Jun. 16, 2016

(65) Prior Publication Data
US 2017/0351123 A1    Dec. 7, 2017

(51) Int. Cl.
*H04B 10/00* (2013.01)
*G02F 1/01* (2006.01)
(Continued)

(52) U.S. Cl.
CPC ............ *G02F 1/0123* (2013.01); *G02F 1/225* (2013.01); *H04B 10/25* (2013.01); *H04B 10/54* (2013.01);
(Continued)

(58) Field of Classification Search
CPC .. G02F 1/0123; G02F 1/225; G02F 2001/212; G02F 2201/58; H04B 10/25; H04B 10/54; H04J 14/02
(Continued)

(56) References Cited

U.S. PATENT DOCUMENTS 7,657,190 B2* 2/2010 Akiyama .............. G02F 1/2255
398/195
9,686,017 B2* 6/2017 Yamanaka ........... H04B 10/564
(Continued)

FOREIGN PATENT DOCUMENTS

JP    2007-208472 A    8/2007
JP    2008-092172 A    4/2008
(Continued)

OTHER PUBLICATIONS

Japanese Office Action dated Aug. 29, 2017 in Japanese Patent Application No. 2016-563350 (with English translation).
(Continued)

*Primary Examiner* — Amritbir Sandhu
(74) *Attorney, Agent, or Firm* — Oblon, McClelland, Maier & Neustadt, L.L.P.

(57) ABSTRACT

An optical transmitter includes an optical modulator configured to modulate input light and output a light signal, a drive unit configured to output a modulation data signal to the optical modulator, and a bias controller configured to perform feedback control of bias voltage applied to the optical modulator. During a modulation OFF operation of the optical modulator, the bias controller switches a control target point from a first control target point to a second control target point and executes the feedback control.

10 Claims, 7 Drawing Sheets

(51) Int. Cl.
*H04B 10/54* (2013.01)
*H04B 10/25* (2013.01)
*G02F 1/225* (2006.01)
*H04J 14/02* (2006.01)
*G02F 1/21* (2006.01)

(52) U.S. Cl.
CPC .... *G02F 2001/212* (2013.01); *G02F 2201/58* (2013.01); *H04J 14/02* (2013.01)

(58) Field of Classification Search
USPC ............... 398/182, 183, 188, 195, 197, 198
See application file for complete search history.

(56) References Cited

U.S. PATENT DOCUMENTS

| | | | |
|---|---|---|---|
| 9,735,878 B2 * | 8/2017 | Enoki | H04B 10/50575 |
| 2007/0146860 A1 * | 6/2007 | Kikuchi | G02F 1/0123 |
| | | | 359/239 |
| 2007/0177882 A1 | 8/2007 | Akiyama | |
| 2007/0206960 A1 | 9/2007 | Nissov et al. | |
| 2008/0080872 A1 | 4/2008 | Tanaka et al. | |
| 2008/0239448 A1 | 10/2008 | Tanaka et al. | |
| 2009/0115544 A1 * | 5/2009 | Kershteyn | H04L 27/2075 |
| | | | 332/103 |
| 2009/0296192 A1 * | 12/2009 | Morishita | G02F 1/0123 |
| | | | 359/288 |
| 2010/0080571 A1 * | 4/2010 | Akiyama | G02F 1/0123 |
| | | | 398/184 |
| 2010/0150495 A1 * | 6/2010 | Kawanishi | G02F 1/3137 |
| | | | 385/3 |
| 2011/0032594 A1 * | 2/2011 | Tanaka | G02F 1/2255 |
| | | | 359/245 |
| 2012/0155880 A1 * | 6/2012 | Nishimoto | H04B 10/50572 |
| | | | 398/79 |
| 2012/0288284 A1 * | 11/2012 | Yoshida | H04B 10/5053 |
| | | | 398/186 |
| 2013/0135704 A1 * | 5/2013 | Fujisaku | H04B 10/50575 |
| | | | 359/279 |
| 2013/0156444 A1 * | 6/2013 | Akashi | G02F 1/0123 |
| | | | 398/186 |

FOREIGN PATENT DOCUMENTS

| | | |
|---|---|---|
| JP | 2008-249848 A | 10/2008 |
| JP | 2009-529834 A | 8/2009 |
| JP | 2010-243953 A | 10/2010 |
| JP | 2012-100006 A | 5/2012 |

OTHER PUBLICATIONS

International Search Report dated Feb. 10, 2015 in PCT/JP2014/082825, filed Dec. 11, 2014.

* cited by examiner

OPTICAL TRANSMITTER

TECHNICAL FIELD

The present invention relates to an optical transmitter that transmits a light signal, and particularly relates to an optical transmitter including optical modulators connected in multiple stages.

BACKGROUND ART

In recent years, in order to meet a rapidly increasing demand for information communication, practical utilization of optical transmitters capable of long distance transmission, high speed transmission, and high density transmission is required. However, in an optical transmission system that performs long distance transmission such as a submarine cable system, there has been a problem that communication performance deteriorates due to transmission penalty accumulated along the length of an optical fiber of a communication path.

In an optical fiber through which a light signal of a single wavelength is transmitted, amplified spontaneous emission (ASE) noise generated in an erbium doped fiber amplifier (EDFA), nonlinear effect caused by the intensity of light propagating in a single fiber, and wavelength dispersion that causes different optical frequencies to proceed at different group velocities, etc. are generation cause of penalty. Moreover, in a wavelength division multiplexing (WDM) system where a plurality of different optical wavelengths exist in the same fiber, inter-wavelength crosstalk caused by a nonlinear refractive index of the fiber can be the penalty.

In the case of high-speed transmission in the optical transmission system, it is effective to increase data rate per wavelength, but increasing the data rate leads to intersymbol interference and causes degradation of a received eye pattern. Distortion of a received waveform is influenced by the configuration of communication lines and the shape of a communication pulse.

As a method for reducing such penalty, it is effective to perform pulse intensity modulation of various known formats synchronized with data symbols, such as RZ (Return-to-Zero) format and CS-RZ (Carrier-Suppressed Return-to-Zero) format, and such pulse intensity modulation is performed by connecting a plurality of optical modulators in cascade (see, for example, patent reference 1 and patent reference 2).

For example, when Mach-Zehnder LiNbO$_3$ external modulators (hereinafter referred to as "Mach-Zehnder modulator") are used in an optical transmitter having a plurality of optical modulators which are connected in cascade, it is necessary for each of the optical modulators to control the bias voltage of the optical modulator according to a modulation format (see, for example, patent reference 3).

PRIOR ART REFERENCE

Patent Reference

PATENT REFERENCE 1 Japanese Patent Application Publication No. 2012-100006
PATENT REFERENCE 2 Japanese National Publication of International Patent Application No. 2009-529834
PATENT REFERENCE 3 Japanese Patent Application Publication No. 2010-243953

SUMMARY OF THE INVENTION

Problem To Be Solved by the Invention

When a two-stage cascade-connected configuration consisting of RZ (Return to Zero) modulator at first stage and DQPSK (Differential Quadrature Phase Shift Keying) modulator at second stage is applied to an optical transmitter having a plurality of optical modulators which are connected in cascade, an optical waveform in which an RZ pulse is superimposed on DQPSK modulation is output from the optical transmitter. Here, when a modulation signal (optical modulator driving signal) for driving the RZ modulator is stopped, it is desirable to be able to output an optical waveform to which only the DQPSK modulation is performed, but in a conventional method for controlling an RZ modulator, it is not easy to stably output a light signal to which only the DQPSK modulation is performed.

In a system in which the first-stage (preceding-stage) optical modulator (e.g., RZ modulator) performs feedback control of a bias voltage for determining an operating point of the optical modulator to a point where the optical transmittance of the optical modulator is maximized, when the modulation signal (e.g., RZ modulation signal) is stopped, the optical transmittance of the optical modulator is maintained to be maximized by the feedback control, but modulation loss of the light signal output from the first-stage optical modulator disappears, and thus the light input intensity into the second-stage (next-stage) optical modulator (e.g., DQPSK modulator) increases, and the feedback control of the bias voltage control circuit in the second-stage optical modulator becomes unstable. On the other hand, in a system in which the first-stage optical modulator (e.g., RZ modulator) performs feedback control of the bias voltage for determining the operating point of the optical modulator to a point where the optical transmittance of the optical modulator is maximized, when the modulation signal (e.g., RZ modulation signal) is stopped, the optical transmittance of the optical modulator is maintained to be minimized by the feedback control, and thus the light output from the first-stage optical modulator to the second-stage optical modulator (e.g., DQPSK modulator) becomes almost zero, and no light output can be obtained.

Thus, an object of the present invention is to provide an optical transmitter that can obtain stable light output even when control of switching between outputting a modulation signal input into at least one optical modulator of a plurality of cascade-connected optical modulators and stopping outputting the modulation signal is executed.

Means of Solving the Problem

An optical transmitter includes a first-stage to Nth-stage (N being an integer of 2 or more) optical modulation units which are connected in cascade, and the optical transmitter outputs a transmission light which is a light signal which has passed through the first-stage to Nth-stage optical modulation units. At least one optical modulation unit of the first-stage to Nth-stage optical modulation units includes an optical modulator configured to modulate input light and output a light signal, and to have an operating point changed according to a value of applied bias voltage, a drive unit configured to output a modulation data signal to the optical modulator, an optical intensity detection unit configured to output a detection signal according to intensity of the light signal output from the optical modulator, and a bias controller configured to perform feedback control for bringing the operating point of the optical modulator closer to a control target point, by controlling the bias voltage on a basis of the detection signal. During a modulation ON operation of the optical modulator, the drive unit outputs the modulation data signal to the optical modulator; the optical modulator outputs the light signal based on the modulation data signal; and the bias controller sets the control target point to a predetermined first control target point and executes the feedback control. During a modulation OFF operation of the optical modulator, the drive unit stops outputting the modulation data signal; and the bias controller switches the control target point from the first control target point to a second control target point and executes the feedback control.

Effects of the Invention

According to the present invention, it is possible to provide an optical transmitter that can obtain stable light output even when control of switching between outputting a modulation signal input into at least one optical modulator of a plurality of optical modulators which are connected in cascade and stopping outputting the modulation signal is executed.

MODE FOR CARRYING OUT THE INVENTION

First Embodiment.
<Configuration and Operation of WDM System 10>

Figure 1:
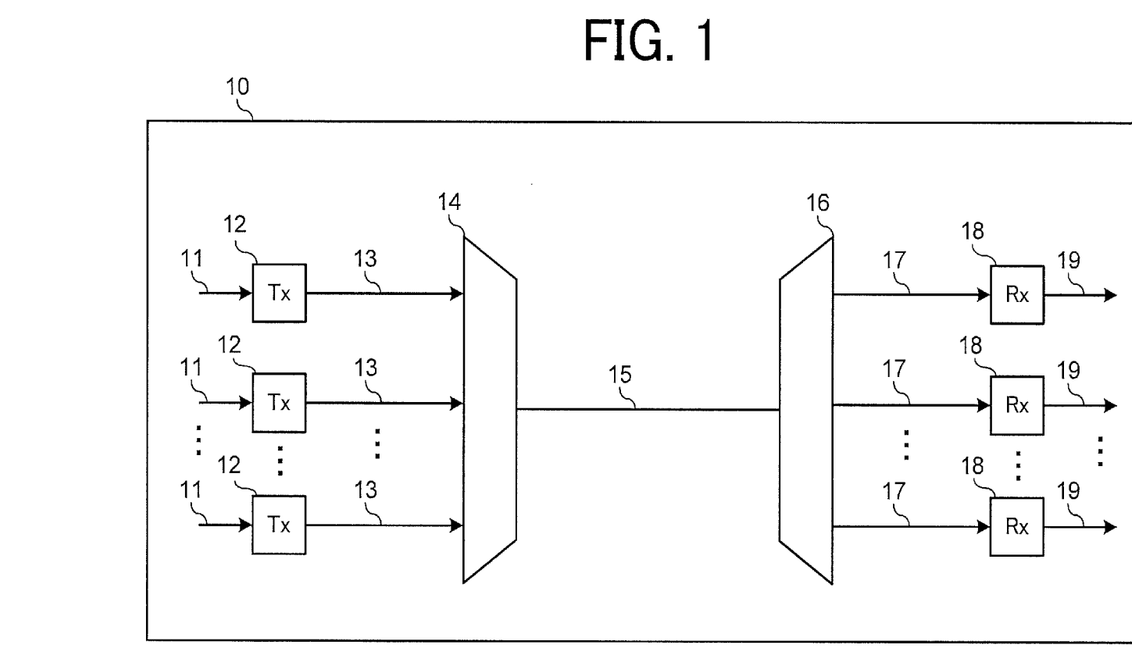
FIG. 1 is a block diagram illustrating an overall configuration of a WDM system including an optical transmitter according to a first embodiment of the present invention.

FIG. 1 is a block diagram illustrating an overall configuration of a WDM system 10 including optical transmitters 12 according to a first embodiment of the present invention.

The WDM system 10 includes a plurality of optical transmitters 12 (Tx), an optical multiplexing unit 14, an optical demultiplexing unit 16, and a plurality of optical receivers 18 (Rx). The optical multiplexing unit 14 and the optical demultiplexing unit 16 are connected via a transmission path 15. Transmission data 11 is input into each of the plurality of optical transmitters 12. The transmission data 11 are converted (electric/optical conversion) from electric signals to light signals by the optical transmitters 12, to generate transmission lights 13 as light signals. The transmission lights 13 are output from the optical transmitters 12. Each of the plurality of transmission lights 13 having different wavelengths and output from the respective optical transmitters 12 is wavelength-multiplexed by the optical multiplexing unit 14 and passes through the transmission path 15. Reception lights 17 obtained by wavelength-division in the optical demultiplexing unit 16 are converted (optical/electric conversion) from light signals to electric signals by the optical receivers 18, and reception data 19 are output.

<Configuration of Optical Transmitter 12>

Figure 2:
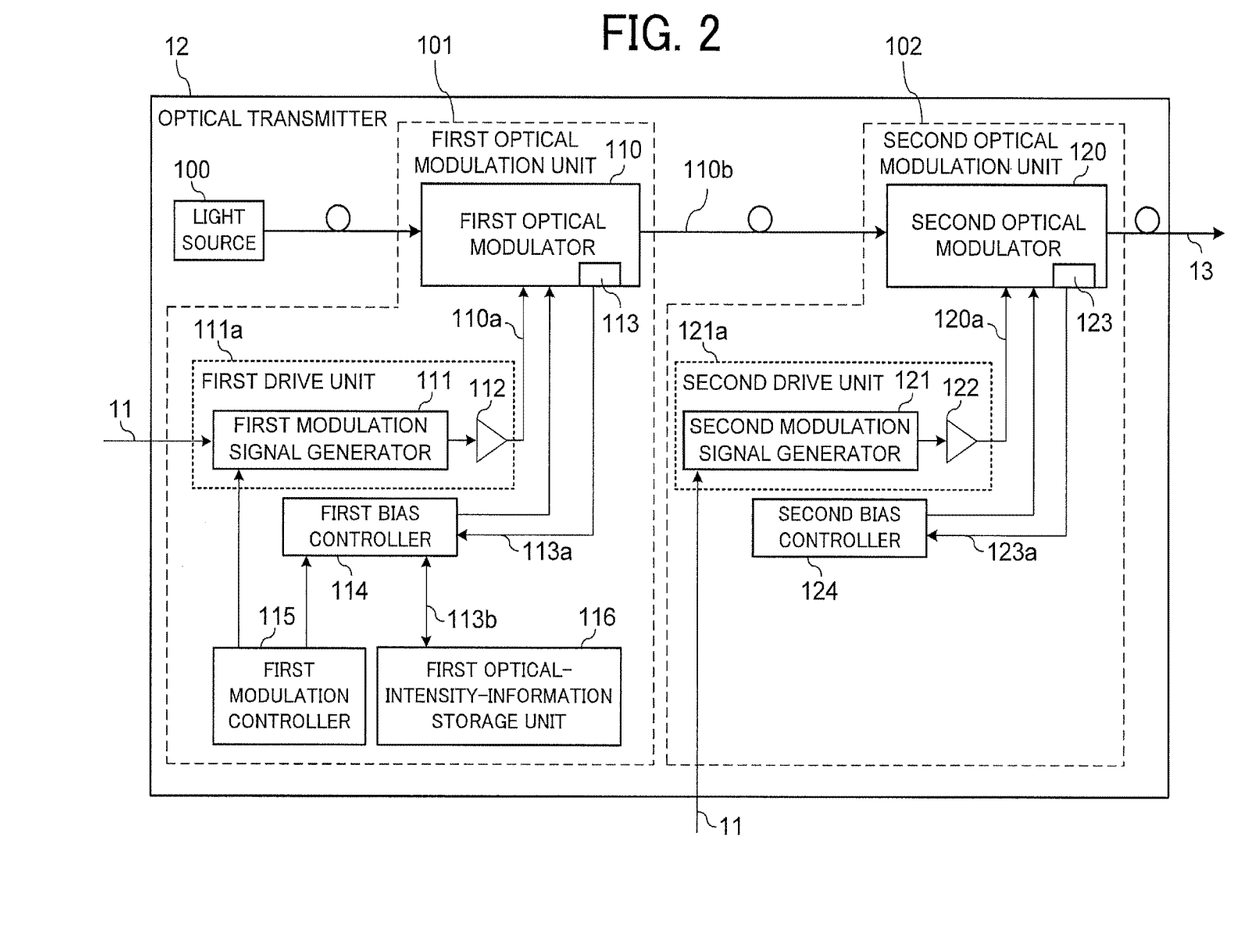
FIG. 2 is a block diagram illustrating a configuration of an optical transmitter according to the first embodiment.

FIG. 2 is a block diagram illustrating a configuration of an optical transmitter 12 according to the first embodiment.

The optical transmitter 12 includes a light source 100 that outputs continuous light. Note that the light source 100 may be located outside the optical transmitter 12. When the light source 100 is located outside the optical transmitter 12, the light emitted from the light source 100 enters the inside of the optical transmitter 12 from outside and enters a first optical modulator 110. The light source 100 is, for example, a light emitting element that emits continuous wave (hereinafter referred to as "CW") and is, for example, a semiconductor laser.

The optical transmitter 12 includes a first optical modulation unit 101 of a preceding-stage (that is, a first-stage optical modulation unit) and a second optical modulation unit 102 of a next-stage (that is, a second-stage optical modulation unit) connected to the first optical modulation unit 101 in cascade (in series). The first optical modulation unit 101 includes a first optical modulator 110 that modulate input light (for example, continuous light output from the light source 100) according to a first modulation signal 110a (first modulation data signal as an optical modulator driving signal) and outputs a light signal 110b (first light signal) and has an operating point that is changed according to a value of applied bias voltage, a first drive unit 111a that outputs the first modulation signal 110a to the first optical modulator 110, a first optical intensity detection unit 113 that outputs a first optical intensity signal 113a as a detection signal (first detection signal) according to the intensity of the light signal 110b output from the first optical modulator 110, and a first bias controller 114 that performs feedback control for bringing the operating point of the first optical modulator 110 closer to a control target point by controlling the bias voltage on the basis of the first optical intensity signal 113a.

The first drive unit 111a includes a first optical modulator driving unit 112 and a first modulation signal generator 111. Moreover, the first optical modulation unit 101 includes a first modulation controller 115 that controls switching between outputting the first modulation signal 110a from the first drive unit 111a and stopping outputting the first modulation signal 110a, and a first optical-intensity-information storage unit 116 that records optical intensity information 113b (first optical intensity information) transmitted from the first optical intensity detection unit 113.

The second optical modulation unit 102 includes a second optical modulator 120 that modulate input light (for example, the light signal 110b output from the first optical modulator 110) according to a second modulation signal 120a (second modulation data signal as an optical modulator driving signal) and outputs the transmission light 13 (second light signal) and has an operating point that is changed according to a value of applied bias voltage, a second drive unit 121a that outputs a second modulation signal 120a to the second optical modulator 120, a second optical intensity detection unit 123 that outputs a second optical intensity signal 123a as a detection signal (second detection signal) according to the intensity of the transmission light 13 output from the second optical modulator 120, and a second bias controller 124 that performs feedback control for bringing the operating point of the second optical modulator 120 closer to a control target point by controlling the bias voltage on the basis of the second optical intensity signal 123a.

The first optical modulator 110 of the first optical modulation unit 101 and the second optical modulator 120 of the second optical modulation unit 102 are connected in cascade (in series) via an optical transmission medium (e.g., optical fiber). As the first optical modulator 110 and the second optical modulator 120, one of a Mach-Zehnder modulator and an electroabsorption modulator or a combination thereof can be used.

<Operation of Optical Transmitter 12>

Next, operation of the optical transmitter 12 will be described. Note that, in this specification, inputting a modulation signal into an optical modulator is referred to as "modulation ON operation", and for example inputting the first modulation signal 110a into the first optical modulator 110 is referred to as "modulation ON operation of the first optical modulator 110". Moreover, a state in which a modulation signal is input into an optical modulator is referred to as "during modulation ON operation", and for example a state in which the first modulation signal 110a is input into the first optical modulator 110 is referred to as "during modulation ON operation of the first optical modulator 110". Moreover, stopping inputting a modulation signal into an optical modulator is referred to as "modulation OFF operation", and for example stopping inputting the first modulation signal 110a into the first optical modulator 110 is referred to as "modulation OFF operation of the first optical modulator 110". Moreover, a state in which inputting a modulation signal into an optical modulator is stopped is referred to as "during modulation OFF operation", and for example, when a state in which inputting the first modulation signal 110a into the first optical modulator 110 is stopped is referred to as "during modulation OFF operation of the first optical modulator 110".

Moreover, in this specification, "modulation ON/OFF" mainly refers to switching from a state in which a modulation signal is input into an optical modulator to a state in which inputting the modulation signal is stopped, and for example "modulation ON/OFF of the first optical modulator 110" refers to switching from a state in which the first modulation signal 110a is input into the first optical modulator 110 to a state in which inputting the first modulation signal 110a is stopped.

The light source 100 outputs continuous light (CW light) toward the first optical modulator 110. The CW light output from the light source 100 is input into the first optical modulator 110, is subjected to modulation based on the first modulation signal 110a input into the first optical modulator 110, and is output as the light signal 110b from the first optical modulator 110.

The light signal 110b output from the first optical modulator 110 is transmitted through an optical transmission medium (for example, optical fiber), is input into the second optical modulator 120, is subjected to modulation based on the second modulation signal 120a input into the second optical modulator 120, and is output as the transmission light 13, which is a light signal, from the second optical modulator 120 and the optical transmitter 12. That is, the CW light output from the light source 100 passes through the first optical modulator 110 and the second optical modulator 120 to be subjected to modulation based on the first modulation signal 110a and the second modulation signal 120a input into the first optical modulator 110 and the second optical modulator 120 respectively, and is output as the transmission light 13 from the optical transmitter 12.

However, the CW light output from the light source 100 is not necessarily subjected to modulation by both the first optical modulator 110 and the second optical modulator 120. For example, the CW light output from the light source 100 may be subjected to modulation by one of the first optical modulator 110 and the second optical modulator 120 to be output from the optical transmitter 12.

For example, an intensity modulation method or a phase modulation method can be employed as modulation methods in the first optical modulator 110 and the second optical modulator 120. For example, RZ modulation or NRZ (Non Return to Zero) modulation can be employed as the intensity modulation method. For example, DPSK (Differential Phase Shift Keying), DQPSK (Differential Quadrature Phase Shift Keying), DP-BPSK (Dual Polarization-Binary Phase Shift Keying), DP-QPSK (Dual Polarization-Quadrature Phase Shift Keying), or the like can be employed as the phase modulation system.

The first modulation signal generator 111 receives the transmission data 11 from the outside, generates the first modulation signal 110a, and outputs the generated first modulation signal 110a to the first optical modulator driving unit 112.

The first optical modulator driving unit 112 amplifies the first modulation signal 110a input from the first modulation signal generator 111 and outputs the amplified first modulation signal 110a to the first optical modulator 110. Here, the first drive unit 111a includes the first modulation signal generator 111 and the first optical modulator driving unit 112. Therefore, the first drive unit 111a generates the first modulation signal 110a on the basis of the transmission data 11 input from the outside, amplifies the first modulation signal 110a, and outputs the first modulation signal 110a to the first optical modulator 110.

The first optical intensity detection unit 113 has a semiconductor light receiving element (for example, a photodiode), and monitors and detects the intensity of the light signal 110b. Specifically, the first optical intensity detection unit 113 converts the light received by the semiconductor light receiving element into monitor current (first monitor current), and monitors and detects the intensity of the light signal 110b on the basis of the value of the monitor current.

The first optical intensity detection unit 113 generates the first optical intensity signal 113a indicating the intensity of the light signal 110b from the monitor current value, and transmits the first optical intensity signal 113a to the first bias controller 114. Moreover, the first optical intensity detection unit 113 detects the intensity of the light signal 110b during the modulation ON operation of the first optical modulator 110 to generate the optical intensity information 113b which is information corresponding to the intensity of the light signal 110b in the modulation ON operation, and transmits the optical intensity information 113b to the first optical-intensity-information storage unit 116. Note that the first optical intensity detection unit 113 is not limited to a configuration incorporated in the first optical modulator 110, and may be located outside the first optical modulator 110.

The first bias controller 114 controls the operating point of the first optical modulator 110 by applying the bias voltage to the first optical modulator 110. Specifically, the operating point of the first optical modulator 110 is controlled, by performing feedback control of the bias voltage necessary for operating the first optical modulator 110 at an appropriate operating point, by using the first optical intensity signal 113a transmitted from the first optical intensity detection unit 113.

The first modulation controller 115 transmits an output command or a stop command to the first modulation signal generator 111 to control switching between outputting the first modulation signal 110a from the first modulation signal generator 111 and stopping outputting the first modulation signal 110a. Moreover, the first modulation controller 115 instructs a change in the control method of the feedback control (switching of the control target), by transmitting a change command (first control signal) to the first bias controller 114, in conjunction with the transmission of the output command or the stop command to the first modulation signal generator 111.

Note that the switching between outputting the first modulation signal 110a and stopping outputting the first modulation signal 110a is not limited to a configuration in which the first modulation controller 115 controls the first modulation signal generator 111. A control unit for controlling outputting the first modulation signal 110a and stopping outputting the first modulation signal 110a may be provided inside the first drive unit 111a, and for example the first modulation signal generator 111 or the control unit provided in the first modulation signal generator 111 may control outputting the first modulation signal 110a from the first optical modulator driving unit 112 and stopping outputting the first modulation signal 110a. Moreover, outputting the first modulation signal 110a from the first optical modulator driving unit 112 and stopping outputting the first modulation signal 110a may be controlled, by controlling ON/OFF of driver output by controlling a power supply or the like of the first optical modulator driving unit 112.

The first optical-intensity-information storage unit 116 stores the optical intensity information 113b transmitted from the first optical intensity detection unit 113 via the first bias controller 114.

Next, operation of the second optical modulation unit 102 in the optical transmitter 12 will be described.

The second modulation signal generator 121 receives the transmission data 11 from the outside, generates the second modulation signal 120a, and outputs the generated second modulation signal 120a to the second optical modulator driving unit 122. The input light (that is, the light signal 110b) input into the second optical modulator 120 is subjected to modulation based on the second modulation signal 120a input into the second optical modulator 120, and is output as the transmission light 13 (second light signal) from the second optical modulator 120.

The second optical modulator driving unit 122 amplifies the second modulation signal 120a input from the second modulation signal generator 121, and outputs the amplified second modulation signal 120a to the second optical modulator 120. Here, the second drive unit 121a includes the second modulation signal generator 121 and the second optical modulator driving unit 122. Therefore, the second drive unit 121a generates the second modulation signal 120a on the basis of the transmission data 11 input from the outside, amplifies the second modulation signal 120a, and outputs the second modulation signal 120a to the second optical modulator 120.

The second optical intensity detection unit 123 has a semiconductor light receiving element (for example, a photodiode), and monitors and detects the intensity of the transmission light 13. Specifically, the second optical intensity detection unit 123 converts the light received by the semiconductor light receiving element into monitor current (second monitor current), and monitors and detects the intensity of the transmission light 13 on the basis of the value of the monitor current. Moreover, the second optical intensity detection unit 123 generates the second optical intensity signal 123a indicating the intensity of the transmission light 13 from the monitor current value, and outputs the second optical intensity signal 123a to the second bias controller 124. Note that the second optical intensity detection unit 123 is not limited to a configuration incorporated in the second optical modulator 120, and may be located outside the second optical modulator 120.

The second bias controller 124 controls the operating point of the second optical modulator 120 by applying the bias voltage to the second optical modulator 120. Specifically, the operating point of the second optical modulator 120 is controlled, by performing feedback control of the bias voltage necessary for operating the second optical modulator 120 at an appropriate operating point, by using the second optical intensity signal 123a transmitted from the second optical intensity detection unit 123.

<Operation of First Optical Modulation Unit 101>

Next, operation of the first optical modulation unit 101 when a Mach-Zehnder modulator is used as the first optical modulator 110 will be described specifically.

Figure 3:
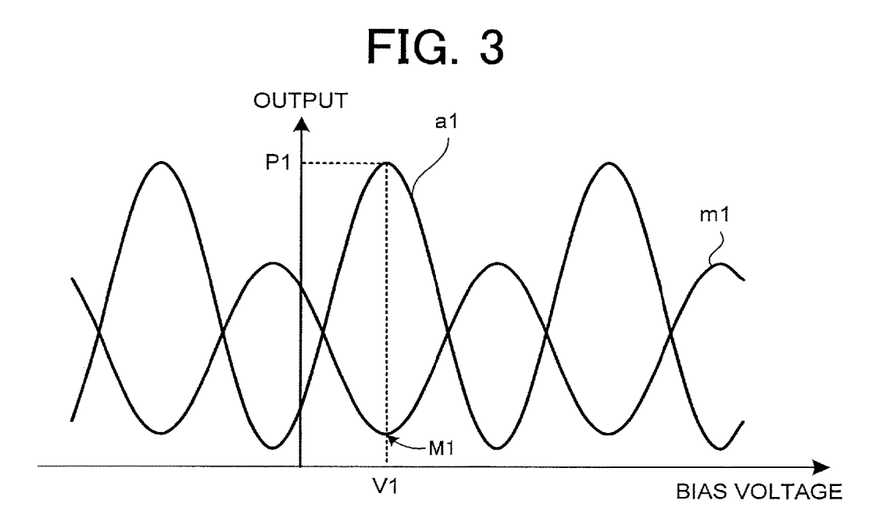
FIG. 3 is a diagram illustrating a relationship between bias voltage applied to a first optical modulator and output of a light signal output from the first optical modulator and a relationship between the bias voltage applied to the first optical modulator and monitor current detected by a first optical intensity detection unit.

FIG. 3 illustrates a diagram illustrating each of a relationship between the bias voltage applied to the first optical modulator 110 and the output of the light signal 110b and a relationship between the bias voltage applied to the first optical modulator 110 and the monitor current detected by the first optical intensity detection unit 113. In a graph illustrated in FIG. 3, the vertical axis represents the output value (light output intensity) of the light signal 110b of the first optical modulator 110 and the output value of the monitor current detected by the first optical intensity detection unit 113, and the horizontal axis represents the value of the bias voltage applied to the first optical modulator 110. That is, a curve a1 illustrated in FIG. 3 indicates the light output value (light output intensity) in relation to the bias voltage applied to the first optical modulator 110, and a curve m1 indicates the output value of the monitor current detected by the first optical intensity detection unit 113 in relation to the bias voltage applied to the first optical modulator 110.

The Mach-Zehnder modulator has a characteristic that the optical transmittance and the monitor current change on the basis of the value of the applied bias voltage. Therefore, the optical transmittance and the light output intensity of the optical modulator can be controlled by controlling the bias voltage with the monitor current value as an index.

The example illustrated in FIG. 3 indicates that the output of the first optical modulator 110 is P1 when the bias voltage is V1, and that the monitor current value is M1 when the output is P1. Therefore, the output of the first optical modulator 110 is controlled to be P1, by executing the feedback control of the bias voltage so that the monitor current value becomes M1, for example.

Figure 4:
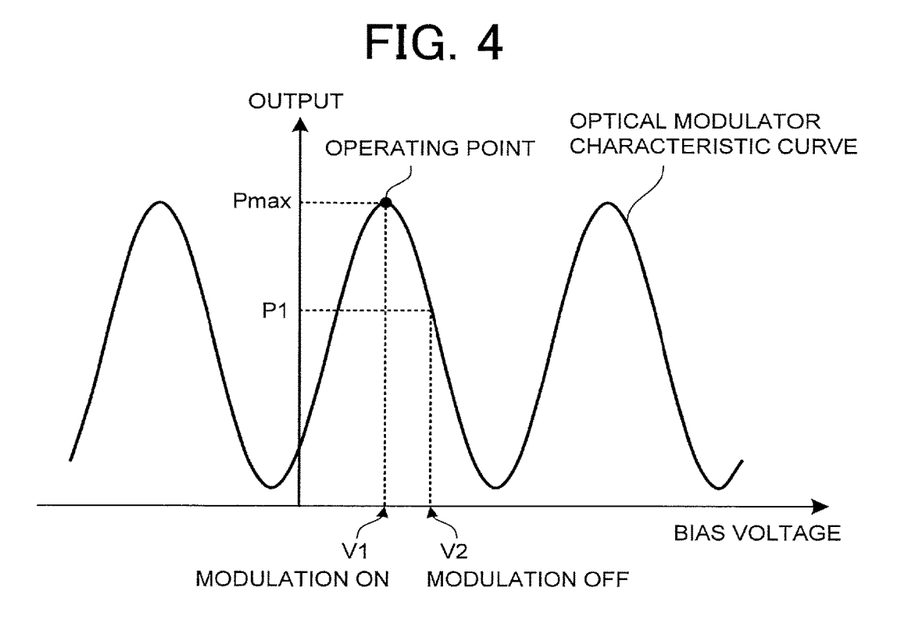
FIG. 4 is a diagram illustrating characteristics of the first optical modulator in relation to bias voltage.

FIG. 4 is a diagram illustrating a characteristic of the first optical modulator 110 in relation to the bias voltage. In a graph illustrated in FIG. 4, the vertical axis represents a theoretical light output value (optical transmittance) calculated from an optical modulator characteristic curve, and the horizontal axis represents the value of the bias voltage applied to the first optical modulator 110.

In the example illustrated in FIG. 4, in the first optical modulator 110, the operating point of the first optical modulator 110 is set so that the optical transmittance of the first optical modulator 110 is maximized during the modulation ON operation of the first optical modulator 110. That is, as illustrated in FIG. 4, the first bias controller 114 sets the control target (control target point) of the feedback control so that the position of the operating point of the first optical modulator 110 is set at a position where the optical transmittance of the first optical modulator 110 is maximized, by using the first optical intensity signal 113a transmitted from the first optical intensity detection unit 113 during the modulation ON operation of the first optical modulator 110, and performs feedback control so as to bring the operating point closer to the set control target point (first control target point).

Here, modulation loss is generated in the light signal 110b that is actually output from the first optical modulator 110 during the modulation ON operation of the first optical modulator 110, and thus the actual output from the first optical modulator 110 is sometimes different from theoretical output (that is, the output calculated from the optical modulator characteristic curve) in relation to the bias voltage. For example, when the bias voltage applied to the first optical modulator 110 is V1, the actual output (intensity) of the light signal 110b output from the first optical modulator 110 is P1, for example, lower than Pmax calculated from the optical modulator characteristic curve.

If the bias voltage applied to the first optical modulator 110 is the same when the input of the first modulation signal 110a into the first optical modulator 110 is switched from ON to OFF during the operation of the optical transmitter 12, the intensity of the light signal (for example, the light signal 110b) input into the next-stage optical modulator (for example, the second optical modulator 120) during the modulation OFF operation of the first optical modulator 110 sometimes becomes too high. That is, when the output of the first modulation signal 110a is switched from ON to OFF and the control target of the feedback control is not changed (for example, when the optical transmittance is controlled to be maximized and the bias voltage is maintained at V1), the intensity of the light signal 110b output from the first optical modulator 110 sometimes becomes too high during the modulation OFF operation of the first optical modulator 110.

Specifically, during the modulation ON operation of the first optical modulator 110, the first bias controller 114 sets the control target of the feedback control (that is, sets the control target point to a predetermined first control target point) so that the position of the operating point of the first optical modulator 110 is set at a position where the optical transmittance of the first optical modulator 110 is maximized, and executes the feedback control, and therefore the bias voltage is maintained at V1 for example when the control target of the feedback control is not changed. When the bias voltage is maintained at, for example, V1 during the modulation OFF operation of the first optical modulator 110, the modulation loss of the light signal 110b disappears in the modulation OFF operation, and therefore the intensity of the light signal 110b becomes Pmax (Pmax>P1) for example.

When the intensity of the light signal (for example, the light signal 110b) input from the preceding-stage optical modulator (for example, the first optical modulator 110) to the next-stage optical modulator (for example, the second optical modulator 120) becomes too high, the feedback control of the bias voltage in the next-stage optical modulator sometimes becomes unstable. Therefore, it is preferable that the intensity of the light signal input from the preceding-stage optical modulator to the next-stage optical modulator be the same before and after switching between the modulation ON operation and the modulation OFF operation in the preceding-stage optical modulator.

Thus, in order to execute the feedback control of the bias voltage applied to the first optical modulator 110 in the modulation OFF operation on the basis of the intensity of the light signal 110b during the modulation ON operation of the first optical modulator 110, the first optical-intensity-information storage unit 116 records the optical intensity information 113b transmitted from the first optical intensity detection unit 113 during the modulation ON operation of the first optical modulator 110.

The optical intensity information 113b is information corresponding to the intensity (for example, the output value P1 illustrated in FIG. 3) of the light signal 110b output from the first optical modulator 110 during the modulation ON operation of the first optical modulator 110, and is generated by the first optical intensity detection unit 113. For example, the optical intensity information 113b is information corresponding to the monitor current value (for example, the output value M1 illustrated in FIG. 3) acquired by the first optical intensity detection unit 113 during the modulation ON operation of the first optical modulator 110. Here, the monitor current value acquired by the first optical intensity detection unit 113 is, for example, a monitor current value corresponding to the average output value of the light signal 110b during the modulation ON operation of the first optical modulator 110. Moreover, for example, the average output value of the monitor current during the modulation ON operation of the first optical modulator 110 may be set as the optical intensity information 113b. Moreover, the monitor current value corresponding to the maximum output value of the light signal 110b during the modulation ON operation of the first optical modulator 110 may be set as the optical intensity information 113b.

When the first modulation controller 115 transmits a stop command of the first modulation signal 110a to the first modulation signal generator 111 during the modulation ON operation of the first optical modulator 110 and the output of the first modulation signal 110a by the first modulation signal generator 111 is stopped, the input of the first modulation signal 110a into the first optical modulator 110 is stopped. Moreover, when the first modulation controller 115 transmits a stop command of the first modulation signal 110a to the first modulation signal generator 111 during the modulation ON operation of the first optical modulator 110, and the input of the first modulation signal 110a into the first optical modulator 110 is stopped, the first modulation controller 115 transmits a change command of the control method of the feedback control by the first bias controller 114 to the first bias controller 114.

When receiving the change command of the control method of the feedback control, the first bias controller 114 switches the control target point by using the optical intensity information 113b recorded in the first optical-intensity-information storage unit 116, and executes the feedback control of the bias voltage applied to the first optical modulator 110 so that the intensity of the light signal 110b output from the first optical modulator 110 is the same before and after modulation ON/OFF of the first optical modulator 110.

Specifically, the first bias controller 114 switches the control target of the feedback control (by switching and setting the control target point from the first control target point to the second control target point) so that the intensity of the light signal 110b output during the modulation OFF operation of the first optical modulator 110 is the same intensity as the intensity of the light signal 110b indicated by the optical intensity information 113b recorded in the first optical-intensity-information storage unit 116 during the modulation ON operation of the first optical modulator 110, and executes the feedback control. That is, during the modulation OFF operation of the first optical modulator 110, the first bias controller 114 executes the feedback control so that the optical intensity information 113b corresponding to the monitor current value detected by the first optical intensity detection unit 113 in the modulation OFF operation is the same as the optical intensity information 113b stored in the first optical-intensity-information storage unit 116 (that is, the optical intensity information 113b recorded in the first optical-intensity-information storage unit 116 during the modulation ON operation of the first optical modulator 110).

Here, the optical intensity information 113b stored in the first optical-intensity-information storage unit 116 indicates the second control target point in the case of switching the control target of the feedback control when the input of the first modulation signal 110a into the first optical modulator 110 is switched from ON to OFF. Therefore, during the modulation OFF operation of the first optical modulator 110, the first drive unit 111a stops outputting the first modulation signal 110a, and the first bias controller 114 switches the control target point from the first control target point to the second control target point and executes the feedback control.

For example, when the intensity of the light signal 110b indicated by the optical intensity information 113b recorded in the first optical-intensity-information storage unit 116 during the modulation ON operation of the first optical modulator 110 is P1, the bias voltage is controlled so that the actual intensity (output value) of the light signal 110b during the modulation OFF operation of the first optical modulator 110 is P1 as illustrated in FIG. 4, and in this case, the bias voltage applied to the first optical modulator 110 is, for example, V2.

Note that the intensity of the light signal 110b output during the modulation OFF operation of the first optical modulator 110 is not necessarily the completely same intensity as the intensity of the light signal 110b indicated by the optical intensity information 113b recorded in the first optical-intensity-information storage unit 116 during the modulation ON operation of the first optical modulator 110, and for example the average output value of the light signal 110b output during the modulation OFF operation of the first optical modulator 110 may be the same intensity as the intensity of the light signal 110b indicated by the optical intensity information 113b recorded in the first optical-intensity-information storage unit 116 during the modulation ON operation of the first optical modulator 110.

According to the optical transmitter 12 of the first embodiment, fluctuation in the intensity of the light signal 110b can be reduced before and after the modulation ON/OFF, by switching the feedback control method during the modulation OFF operation of the first optical modulator 110, so that the intensity of the light signal 110b output during the modulation OFF operation of the first optical modulator 110 is the same intensity as the intensity of the light signal 110b indicated by the optical intensity information 113b recorded in the first optical-intensity-information storage unit 116 during the modulation ON operation of the first optical modulator 110, and therefore it is possible to stabilize the feedback control of the bias voltage in the second optical modulator 120 into which the light signal 110b output during the modulation OFF operation of the first optical modulator 110 is input. Moreover, since it is possible to keep the intensity of the light signal 110b output from the first optical modulator 110 constant during the operation of the optical transmitter 12, it is possible to dynamically switch between outputting the first modulation signal 110a and stopping outputting the first modulation signal 110a in the first optical modulator 110, and it is possible to keep the intensity of the light signal 110b input into the second optical modulator 120 at the next-stage constant regardless of the state of the modulation ON operation or the modulation OFF operation in the first optical modulator 110.

The first embodiment has described an example in which the control target (first control target point) of the feedback control is set so that the operating point is set at the position where the optical transmittance of the first optical modulator 110 during the modulation ON operation of the first optical modulator 110 is maximized, but the optical transmittance of the first optical modulator 110 during the modulation ON operation of the first optical modulator 110 is not necessarily maximized, and for example the control target (first control target point) of the feedback control may be set so that the operating point is set at the position where the optical transmittance of the first optical modulator 110 in the modulation ON operation is 50%. By setting the optical transmittance (for example, 50%) that can obtain light output greater than zero at least in the first optical modulator 110 at the preceding-stage, an optical waveform (light signal) modulated by the second optical modulator 120 at the next-stage can be output from the optical transmitter 12, even when control of switching between outputting the first modulation signal 110a input into the first optical modulator 110 and stopping outputting the first modulation signal 110a is executed.

Moreover, the first embodiment has described an example in which the bias voltage is switched from the voltage V1 to the voltage V2 during the modulation OFF operation of the first optical modulator 110. The control target of the feedback control, however, may be switched to reduce the fluctuation in the intensity of the light signal 110b output from the first optical modulator 110 before and after the modulation ON/OFF, and the bias voltage value before and after the modulation ON/OFF is not limited.

Although in the first embodiment the operation of the first optical modulation unit 101 in the case of using the Mach-Zehnder modulator as the first optical modulator 110 has been described specifically, the present invention can be also applied to a case using an optical modulator other than the Mach-Zehnder modulator as the optical modulator. Although the relationship between bias voltage to be applied and the optical transmittance sometimes varies, depending on the type of the used optical modulator, it is possible to obtain the same effect as the above-described optical transmitter 12 by switching the feedback control method during the modulation OFF operation of the first optical modulator 110 so that the intensity of the light signal 110b output during the modulation OFF operation of the first optical modulator 110 is the same intensity as the intensity of the light signal 110b indicated by the optical intensity information 113b recorded in the first optical-intensity-information storage unit 116 during the modulation ON operation of the first optical modulator 110, as described in the first embodiment.

Second Embodiment.

Figure 5:
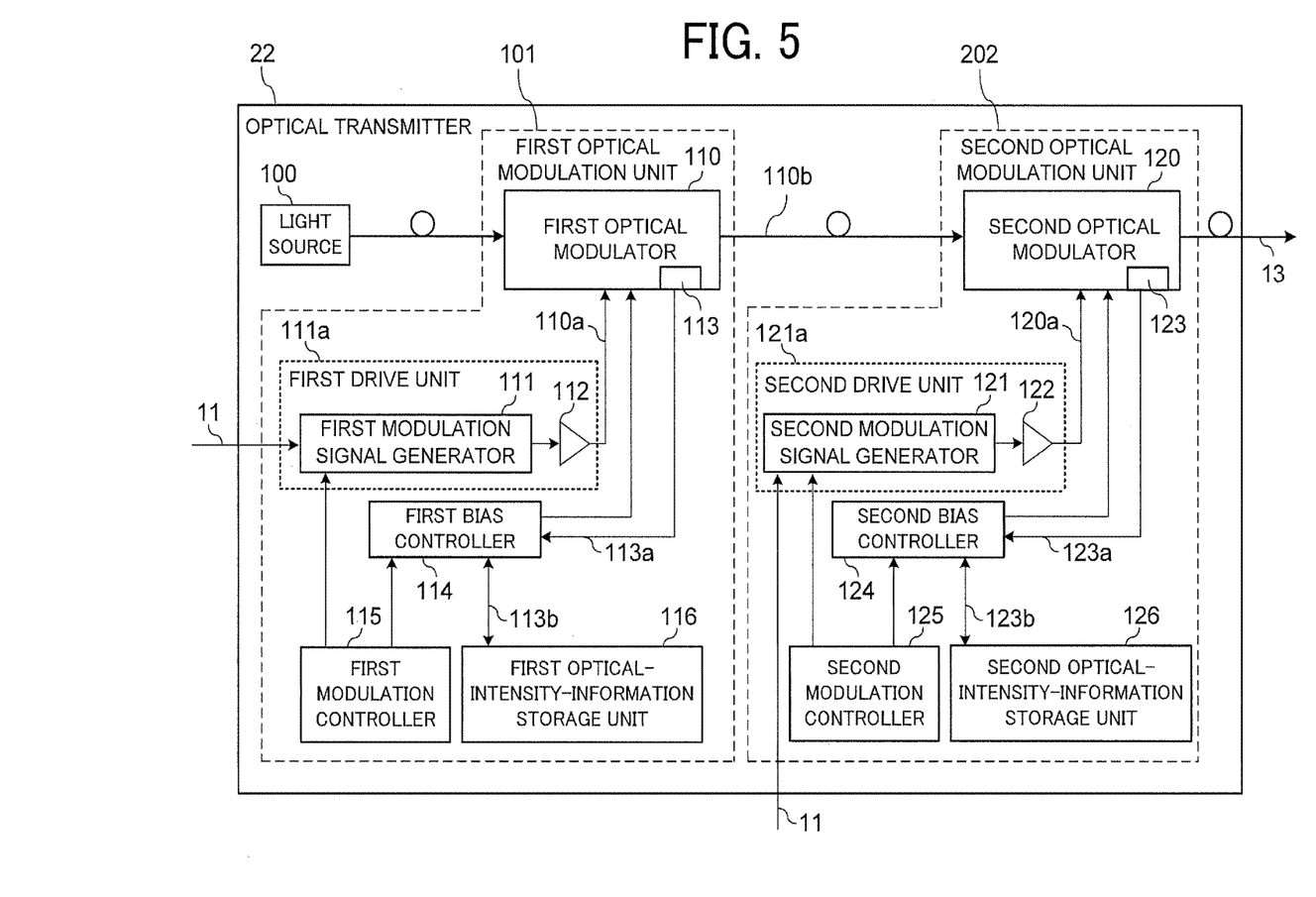
FIG. 5 is a block diagram illustrating a configuration of an optical transmitter according to a second embodiment of the present invention.

FIG. 5 is a block diagram illustrating a configuration of an optical transmitter 22 according to a second embodiment of the present invention.

The optical transmitter 22 according to the second embodiment corresponds to the optical transmitter 12 in the WDM system 10 described in the first embodiment. The optical transmitter 22 according to the second embodiment is different from the optical transmitter 12 according to the first embodiment in that a second optical modulation unit 202 further includes a second modulation controller 125 and a second optical-intensity-information storage unit 126. Except for this point, the optical transmitter 22 according to the second embodiment is the same as the optical transmitter 12 according to the first embodiment. Therefore, in the optical transmitter 22 illustrated in FIG. 5, the components which are the same as or correspond to the components of the optical transmitter 12 illustrated in FIG. 2 are denoted with the same reference signs as the reference signs illustrated in FIG. 2.

The second optical intensity detection unit 123 in the second optical modulation unit 202 detects the intensity of the transmission light 13 (second light signal) during the modulation ON operation of the second optical modulator 120, to generate second optical intensity information 123b which is information corresponding to the intensity of the transmission light 13 during the modulation ON operation of the second optical modulator 120, and outputs the second optical intensity information 123b to the second optical-intensity-information storage unit 126.

The second modulation controller 125 in the second optical modulation unit 202 corresponds to the first modulation controller 115 in the first optical modulation unit 101, and has the same function as the first modulation controller 115. That is, the second modulation controller 125 transmits an output command or a stop command to the second modulation signal generator 121 to control switching between outputting the second modulation signal 120a from the second modulation signal generator 121 and stopping outputting the second modulation signal 120a. Moreover, the second modulation controller 125 instructs to change the control method for the feedback control (switching of the control target), by transmitting a change command (second control signal) to the second bias controller 124, in conjunction with the transmission of the output command or the stop command to the second modulation signal generator 121.

Note that the switching between outputting the second modulation signal 120a and stopping outputting the second modulation signal 120a is not limited to a configuration in which the second modulation controller 125 controls the second modulation signal generator 121. A control unit for controlling outputting the second modulation signal 120a and stopping outputting the second modulation signal 120a may be provided inside the second drive unit 121a, and for example the second modulation signal generator 121 or the control unit provided in the second modulation signal generator 121 may control outputting the second modulation signal 120a from the second optical modulator driving unit 122 and stopping outputting the second modulation signal 120a. Moreover, outputting the second modulation signal 120a from the second optical modulator driving unit 122 and stopping outputting the second modulation signal 120a may be controlled, by controlling ON/OFF of driver output by controlling a power supply of the second optical modulator driving unit 122 or the like.

The second optical-intensity-information storage unit 126 in the second optical modulation unit 202 corresponds to the first optical-intensity-information storage unit 116 in the first optical modulation unit 101, and has the same function as the first optical-intensity-information storage unit 116. That is, the second optical-intensity-information storage unit 126 stores the second optical intensity information 123b transmitted from the second optical intensity detection unit 123 via the second bias controller 124.

Moreover, the second optical intensity information 123b in the second optical modulation unit 202 corresponds to the first optical intensity information 113b in the first optical modulation unit 101. That is, the second optical intensity information 123b is information corresponding to the intensity of the transmission light 13 output from the second optical modulator 120 during the modulation ON operation of the second optical modulator 120.

As described above, each of the first optical modulation unit 101 and the second optical modulation unit 202 of the optical transmitter 22 includes the components which are the same as or correspond to the components of the first optical modulation unit 101 described in the first embodiment, and therefore each of the first optical modulation unit 101 and the second optical modulation unit 202 in the optical transmitter 22 performs the same operation and has the same function as the first optical modulation unit 101 described in the first embodiment. That is, when receiving the change command of the control method of the feedback control from the second modulation controller 125, the second bias controller 124 switches the control target point by using the second optical intensity information 123b recorded in the second optical-intensity-information storage unit 126, and executes the feedback control of the bias voltage to be applied to the second optical modulator 120 so that the intensity of the second light signal output from the second optical modulator 120 is the same before and after the modulation ON/OFF in the second optical modulator 120.

Specifically, the second bias controller 124 switches the control target of the feedback control (by switching and setting the control target point from the first control target point to the second control target point) so that the intensity of the transmission light 13 output during the modulation OFF operation of the second optical modulator 120 is the same intensity as the intensity of the transmission light 13 indicated by the second optical intensity information 123b recorded in the second optical-intensity-information storage unit 126 during the modulation ON operation of the second optical modulator 120, and executes the feedback control. That is, during the modulation OFF operation of the second optical modulator 120, the second bias controller 124 executes the feedback control, so that the second optical intensity information 123b corresponding to the monitor current value detected by the second optical intensity detection unit 123 in the modulation OFF operation is the same as the second optical intensity information 123b stored in the second optical-intensity-information storage unit 126 (that is, the second optical intensity information 123b recorded in the second optical-intensity-information storage unit 126 during the modulation ON operation of the second optical modulator 120).

Here, the second optical intensity information 123b stored in the second optical-intensity-information storage unit 126 indicates the second control target point in the case of switching the control target of the feedback control when the input of the second modulation signal 120a into the second optical modulator 120 is switched from ON to OFF. Therefore, during the modulation OFF operation of the second optical modulator 120, the second drive unit 121a stops outputting the second modulation signal 120a, and the second bias controller 124 switches the control target point from the first control target point to the second control target point and executes the feedback control. Accordingly, it is possible to keep the intensity of the transmission light 13 output from the second optical modulator 120 constant during the operation of the optical transmitter 22.

Here, the first modulation controller 115 and the second modulation controller 125 of the optical transmitter 22 operate independently of each other. Moreover, the first bias controller 114 and the second bias controller 124 switch the control methods of the bias voltage independently of each other. That is, for example, during the modulation OFF operation of the first optical modulator 110, the first bias controller 114 switches the control target point from the first control target point to the second control target point and executes the feedback control, independently of the second optical modulation unit 202. In the same way, for example, during the modulation OFF operation of the second optical modulator 120, the second bias controller 124 switches the control target point from the first control target point to the second control target point and executes the feedback control, independently of the first optical modulation unit 101. Note that the control target points separately set in the first optical modulation unit 101 and the second optical modulation unit 202 may be different from each other.

Therefore, it is possible to switch modulation ON/OFF independently in each of the first optical modulation unit 101 and the second optical modulation unit 202. Accordingly, it is possible to dynamically change a combination of modulation methods by the first optical modulation unit 101 and the second optical modulation unit 202 during the operation of the light transmitter 22.

From the above, according to the optical transmitter 22 of the second embodiment, in the optical transmitter 22 in which a plurality of optical modulators (the first optical modulator 110 and the second optical modulator 120) are connected in cascade, the fluctuation in the intensity of the light signal 110b input into the second optical modulator 120 at the next-stage is reduced before and after the first modulation signal 110a for driving the first optical modulator 110 at the preceding-stage is stopped, it is possible to achieve stable feedback control in the second optical modulator 120.

Moreover, the optical transmitter 22 can keep the intensity of the light signal 110b constant before and after the modulation ON/OFF of the first optical modulator 110, and furthermore can keep the intensity of the transmission light 13 constant before and after the modulation ON/OFF of the second optical modulator 120, regardless of the state of the modulation ON operation or the modulation OFF operation of the first optical modulator 110. Therefore, it is possible to obtain the same light output from the optical transmitter 22 before and after the modulation ON/OFF in each optical modulator, regardless of the state of the modulation ON operation or the modulation OFF operation in each optical modulator of the optical transmitter 22.

Further, during the operation of the optical transmitter 22, it is possible to dynamically change the combination of the modulation methods in the first optical modulation unit 101 and the second optical modulation unit 202. Accordingly, it is possible to obtain an optical modulation signal (transmission light 13) in which any modulation signals are combined, from the optical transmitter 22.

Figure 6:
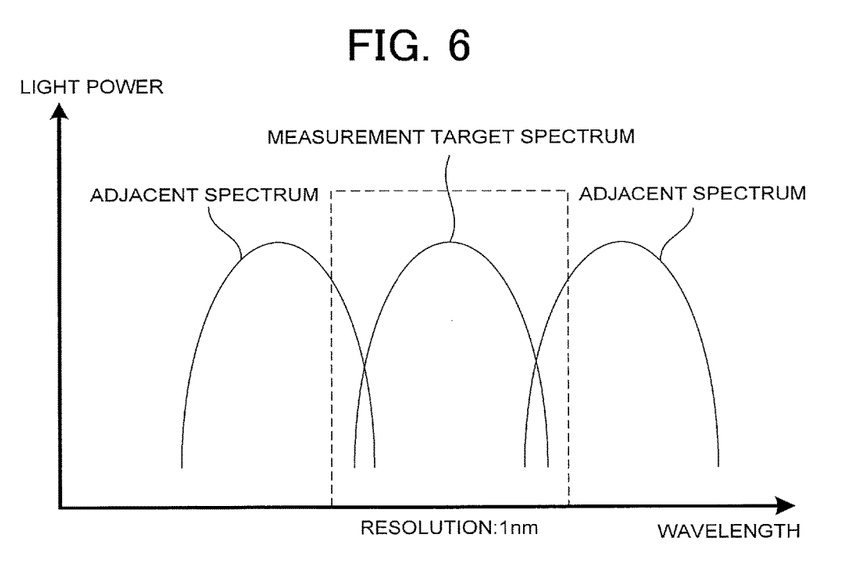
FIG. 6 is a diagram illustrating spectra of a light signal passing through a transmission path during modulation ON operation of a second optical modulator.

FIG. 6 is a diagram illustrating spectra of the light signal passing through the transmission path 15 during the modulation ON operation of the second optical modulator 120. When an optical signal to noise ratio (hereinafter referred to as "OSNR") is measured by using an optical spectrum analyzer in the WDM system, it is common to set the resolution to 0.1 nm, for example. However, since the spectra of the light signal are broadened because of the modulation of the CW light, the measurement target spectrum is unable to be confined to a range of 0.1 nm in some cases. In this case, if the measurement resolution is broadened to a range that covers the spectrum of the modulated light signal, the intensity of the light signal can be measured but affected by overlap of light signal spectra from wavelengths adjacent to the measurement target wavelength in WDM communication, and therefore it cannot be accurately measured.

Figure 7:
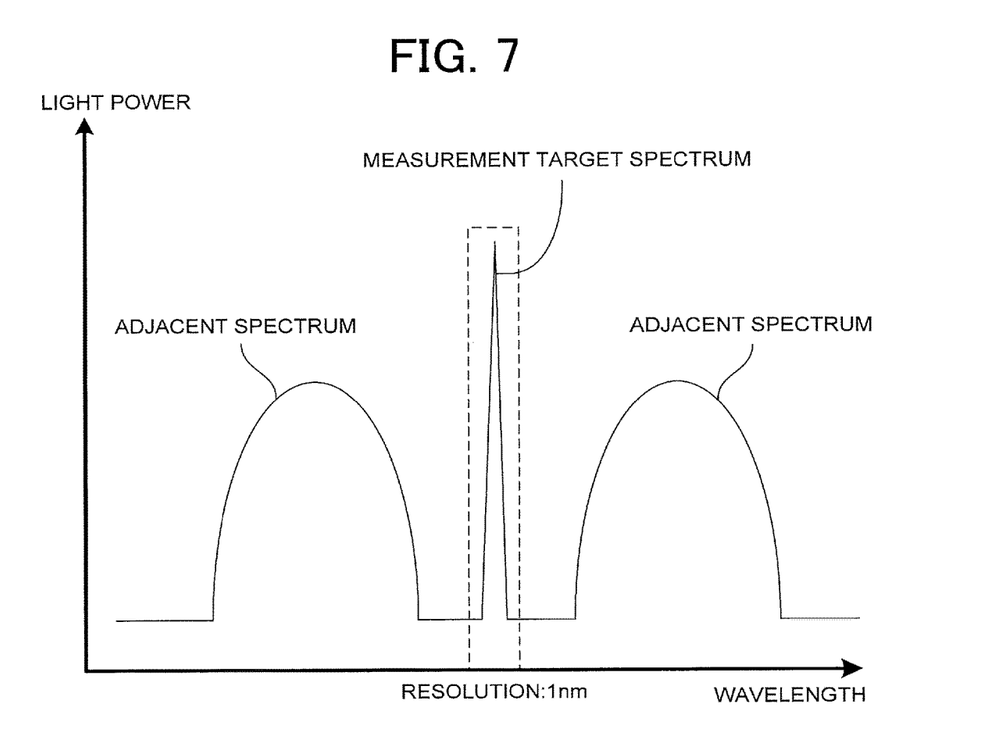
FIG. 7 is a diagram illustrating spectra of a light signal passing through a transmission path when modulation ON operation is switched to modulation OFF operation in each of the first optical modulator and the second optical modulator.

FIG. 7 is a diagram illustrating spectra of the light signal passing through the transmission path 15 when the modulation ON operation is switched to the modulation OFF operation in each of the first optical modulator 110 and the second optical modulator 120.

As illustrated in FIG. 7, the optical transmitter 22 according to the second embodiment can obtain unmodulated CW light of which the light output intensity is maintained to be the same as that during the modulation ON operation of the second optical modulator 120, even when all the optical modulators of the optical transmitter 22 (that is, the first optical modulator 110 and the second optical modulator 120) are dynamically switched to the modulation OFF operation during the operation of the optical transmitter 22. Therefore, it is possible to perform OSNR measurement with measurement resolution of 0.1 nm, and the OSNR measurement can be performed with high accuracy even under WDM communication environment.

Third Embodiment.

Figure 8:
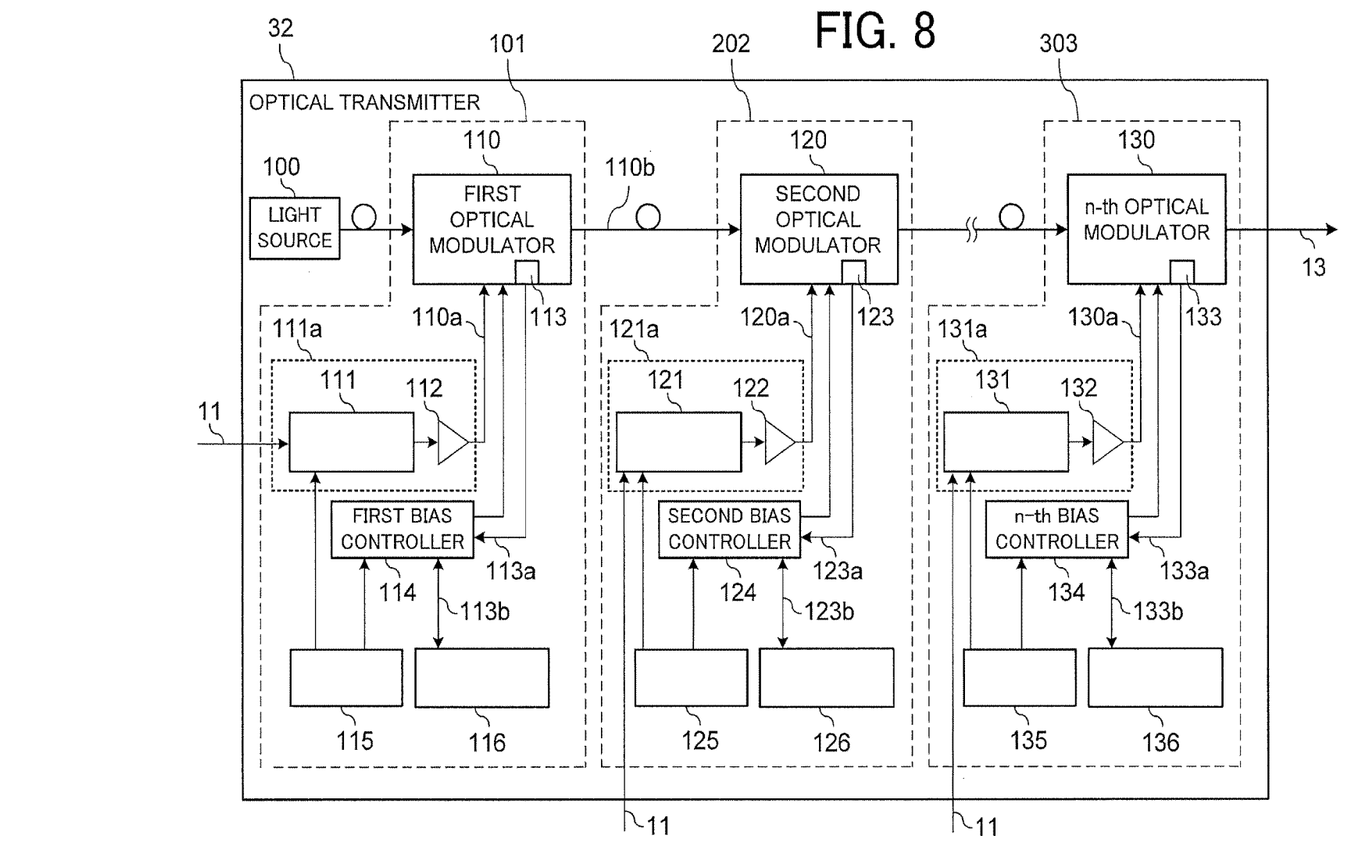
FIG. 8 is a block diagram illustrating a configuration of an optical transmitter according to a third embodiment of the present invention.

FIG. 8 is a block diagram illustrating a configuration of an optical transmitter 32 according to a third embodiment of the present invention.

The optical transmitter 32 according to the third embodiment corresponds to the optical transmitter 12 in the WDM system 10 described in the first embodiment. The optical transmitter 32 according to the third embodiment is different from the optical transmitter 22 according to the second embodiment in that optical modulation units (for example, n-th optical modulation unit 303) is further connected in cascade in addition to the first optical modulation unit 101 and the second optical modulation unit 202, and the optical modulation units of three or more stages are provided. Except for this point, the optical transmitter 32 according to the third embodiment is the same as the optical transmitter 22 according to the second embodiment. Therefore, in the optical transmitter 32 illustrated in FIG. 8, the components which are the same as or correspond to the components of the optical transmitter 22 illustrated in FIG. 5 are denoted with the same reference signs as the reference signs illustrated in FIG. 5.

Although the first and second embodiments have illustrated examples of the optical transmitters in which the optical modulation units of two stages are connected in cascade, the third embodiment illustrates an example of an optical transmitter in which the optical modulation units of n stages (n is an integer that satisfies 3≤n≤N, and N is an integer equal to or greater than 4) are connected in cascade in the optical transmitter 32 (that is, an optical transmitter including n-th stage optical modulation units). That is, the n-th optical modulation unit 303 illustrated in FIG. 8 is an optical modulation unit connected in cascade at n-th stage counted from the first optical modulation unit 101 which is a first-stage of a plurality of optical modulation units. The n-th optical modulation unit 303 is connected to an (n−1)-th stage optical modulation unit in cascade. Note that the n-th optical modulation unit 303 described in the third embodiment is at least one optical modulation unit of the first-stage to Nth-stage optical modulation units. The n-th optical modulation unit 303, however, is also applied to another optical modulation unit (e.g., (n−1)-th optical modulation unit, (n−2)-th optical modulation unit or the like) when the optical modulation units are configured to have n stages.

The n-th optical modulation unit 303 described in the third embodiment includes components which are the same as or correspond to, for example, the second optical modulation unit 202 of the plurality of optical modulation units included in the optical transmitter 32. For example, in the n-th optical modulation unit 303, an n-th optical modulator 130 corresponds to the second optical modulator 120. Other components also have the same correspondence relationship. That is, an n-th modulation signal generator 131 corresponds to the second modulation signal generator 121. An n-th drive unit 131a corresponds to the second drive unit 121a. An n-th optical modulator driving unit 132 corresponds to the second optical modulator driving unit 122. An n-th optical intensity detection unit 133 corresponds to the second optical intensity detection unit 123. An n-th bias controller 134 corresponds to the second bias controller 124. An n-th modulation controller 135 corresponds to the second modulation controller 125. An n-th optical-intensity-information storage unit 136 corresponds to the second optical-intensity-information storage unit 126. An n-th modulation signal 130a (n-th modulation data signal as an optical modulator driving signal) corresponds to the second modulation signal 120a. An n-th optical intensity signal 133a as a detection signal (n-th detection signal) corresponds to the second optical intensity signal 123a. An n-th optical intensity information 133b corresponds to the second optical intensity information 123b.

The n-th optical modulation unit 303 of the optical transmitter 32 includes the components which are the same as or correspond to the components of the second optical modulation unit 202 described in the second embodiment, and therefore performs the same operation and has the same function as the second optical modulation unit 202 described in the second embodiment. That is, when receiving a change command of the control method of the feedback control from the n-th modulation controller 135, the n-th bias controller 134 switches the control target point by using the n-th optical intensity information 133b recorded in the n-th optical-intensity-information storage unit 136, and executes the feedback control of the bias voltage applied to the n-th optical modulator 130 so that the intensity of the n-th light signal output from the n-th optical modulator 130 is the same before and after the modulation ON/OFF of the n-th optical modulator 130.

Specifically, the n-th bias controller 134 switches the control target of the feedback control (by switching and setting the control target point from the first control target point to the second control target point) so that the intensity of the n-th light signal (e.g., the transmission light 13) output from the n-th optical modulator 130 during the modulation OFF operation of the n-th optical modulator 130 is the same intensity as the intensity of the n-th light signal indicated by the n-th optical intensity information 133b recorded in the n-th optical-intensity-information storage unit 136 during the modulation ON operation of the n-th optical modulator 130, and executes the feedback control. That is, during the modulation OFF operation of the n-th optical modulator 130, the n-th bias controller 134 executes the feedback control so that the n-th optical intensity information 133b corresponding to the monitor current value detected by the n-th optical intensity detection unit 133 in the modulation OFF operation is the same as the n-th optical intensity information 133b stored in the n-th optical-intensity-information storage unit 136 (that is, the n-th optical intensity information 133b recorded in the n-th optical-intensity-information storage unit 136 during the modulation ON operation of the n-th optical modulator 130).

Here, the n-th optical intensity information 133b stored in the n-th optical-intensity-information storage unit 136 indicates the second control target point in the case of switching the control target of the feedback control when the input of the n-th modulation signal 130a into the n-th optical modulator 130 is switched from ON to OFF. Therefore, during the modulation OFF operation of the n-th optical modulator 130, the n-th drive unit 131a stops outputting the n-th modulation signal 130a, and the n-th bias controller 134 switches the control target point from the first control target point to the second control target point and executes the feedback control. Therefore, it is possible to keep the intensity of the n-th light signal output from the n-th optical modulator 130 constant during the operation of the optical transmitter 32.

Here, the modulation controllers from the first modulation controller 115 to the n-th modulation controller 135 provided respectively in the optical modulation units from the first optical modulation unit 101 to the n-th optical modulation unit 303 in the optical transmitter 32 operate independently of each other. Moreover, the bias controllers from the first bias controller 114 to the n-th bias controller 134 provided respectively in the optical modulation units from the first optical modulation unit 101 to the n-th optical modulation unit 303 in the optical transmitter 32 switches bias voltage control methods independently of each other. That is, for example, during the modulation OFF operation of the n-th optical modulator 130, the n-th bias controller 134 switches the control target point from the first control target point to the second control target point and executes the feedback control, independently of other optical modulation units. Note that the control target points set respectively in the optical modulation units in the optical transmitter 32 may be different from each other.

Therefore, it is possible to switch modulation ON/OFF independently in any optical modulation unit of the respective optical modulation units from the first optical modulation unit 101 to the n-th optical modulation unit 303. Accordingly, it is possible to dynamically change the combination of the modulation methods by any optical modulation units from the first optical modulation unit 101 to the n-th optical modulation unit 303 during the operation of the optical transmitter 32.

According to the optical transmitter 32 of the third embodiment, in the optical transmitter 32 in which the optical modulators of n stages are connected in cascade, the fluctuation in the intensity of the light signal input into the next-stage optical modulator (e.g., the n-th optical modulator 130 at the n-th stage) is reduced before and after the modulation signal for driving the preceding-stage optical modulator (e.g., the (n−1)-th optical modulator at the (n−1)-th stage) is stopped, and therefore it is possible to achieve stable feedback control in the next-stage optical modulator.

Moreover, it is possible for the optical transmitter 32 to keep the intensity of the light signal output from each optical modulator constant, before and after the modulation ON/OFF in any optical modulation unit of the respective optical modulation units from the first optical modulation unit 101 to the n-th optical modulation unit 303. Therefore, it is possible to obtain the same light output from the optical transmitter 32 before and after the modulation ON/OFF in each of the optical modulators, regardless of the state of the modulation ON operation or the modulation OFF operation in each of the optical modulators of the optical transmitter 32.

Further, the combination of the modulation methods in the plurality of optical modulation units can be changed dynamically in the operation of the optical transmitter 32. Accordingly, it is possible to obtain the optical modulation signal (transmission light 13) in which any modulation signals are combined, from the optical transmitter 32.

From the above, according to the optical transmitter 32 of the third embodiment, there can be provided an optical transmitter which can execute stable feedback control in each optical modulator to output an optical waveform (light signal) to which arbitrary modulation is performed, even when performing control of switching between outputting the modulation signal input into an arbitrary optical modulator of the plurality of optical modulators connected in multiple stages and stopping outputting the modulation signal.

Although, in each of the above-described embodiments, the operation of the optical transmitters 12, 22, and 32 in the case of switching from the modulation ON to the modulation OFF has been described mainly, each optical transmitter (e.g., the optical transmitter 12) is controlled so that the intensity of the light signal (e.g., the light signal 110*b*) output during the modulation OFF operation of each optical modulator (e.g., the first optical modulator 110) is the same as the intensity of the light signal output during the modulation ON operation. Accordingly, the intensity of the light signal output from the optical modulator can be made the same before and after the switching, even when the modulation OFF operation is then switched to the modulation ON operation. Therefore, there can be provided the optical transmitters 12, 22, and 32 which can execute stable feedback control in each optical modulator and output an arbitrarily modulated optical waveform (light signal), even when control for switching from the modulation ON operation to the modulation OFF operation and then switching to the modulation ON operation is executed in each of the optical modulators of the optical transmitters 12, 22, and 32.

DESCRIPTION OF REFERENCE CHARACTERS

10 WDM system, 11 transmission data, 12, 22, 32 optical transmitter, 13 transmission light, 14 optical multiplexing unit, 15 transmission path, 16 optical demultiplexing unit, 17 reception light, 18 optical receiver, 19 received data, 100 light source, 101 first optical modulation unit (first-stage optical modulation unit), 102, 202 second optical modulation unit (second-stage optical modulation unit), 110 first optical modulator, 110*a* first modulation signal, 110*b* light signal, 111 first modulation signal generator, 112 first optical modulator driving unit, 113 first optical intensity detection unit, 113*a* first optical intensity signal, 113*b* first optical intensity information, 114 first bias controller, 115 first modulation controller, 116 first optical-intensity-information storage unit, 120 second optical modulator, 120*a* second modulation signal, 121 second modulation signal generator, 122 second optical modulator driving unit, 123 second optical intensity detection unit, 123*a* second optical intensity signal, 123*b* second optical intensity information, 124 second bias controller, 125 second modulation controller, 126 second optical-intensity-information storage unit, 130 n-th optical modulator, 130*a* n-th modulation signal, 131 n-th modulation signal generator, 132 n-th optical modulator driving unit, 133 n-th optical intensity detection unit, 133*a* n-th optical intensity signal, 133*b* n-th optical intensity information, 134 n-th bias controller, 135 n-th modulation controller, 136 n-th optical-intensity-information storage unit, 303 n-th optical modulation unit (n-th stage optical modulation unit).

What is claimed is:

1. An optical transmitter including a first-stage to an Nth-stage (N being an integer of 2 or more) optical modulation devices which are connected in cascade, and which outputs a transmission light which is a light signal which has passed through the first-stage to Nth-stage optical modulation devices, wherein
at least one optical modulation device of the first-stage to the Nth-stage optical modulation devices includes:
an optical modulator configured to modulate input light and output a light signal, and to have an operating point changed according to a value of applied bias voltage;
a driver configured to output a modulation data signal to the optical modulator;
an optical intensity detector configured to output a detection signal according to an intensity of the light signal output from the optical modulator; and
a bias controller configured to perform feedback control to bring the operating point of the optical modulator towards a control target point, by controlling the applied bias voltage on a basis of the detection signal,
wherein during a modulation ON operation of the optical modulator, the driver outputs the modulation data signal to the optical modulator; the optical modulator outputs the light signal based on the modulation data signal; and the bias controller sets the control target point to a predetermined first control target point and executes the feedback control, and
during a modulation OFF operation of the optical modulator, the driver stops outputting the modulation data signal; and the bias controller switches the control target point from the first control target point to a second control target point and executes the feedback control.

2. The optical transmitter according to claim 1, wherein during the modulation OFF operation, the bias controller switches the control target point from the first control target point to the second control target point so that the intensity of the light signal in the modulation OFF operation is the same as the intensity of the light signal during the modulation ON operation.

3. The optical transmitter according to claim 1, further comprising a modulation controller configured to control switching between outputting the modulation data signal output from the driver and stopping outputting the modulation data signal.

4. The optical transmitter according to claim 1, further comprising an optical-intensity-information storage configured to record optical intensity information which is information corresponding to the intensity of the light signal during the modulation ON operation.

5. The optical transmitter according to claim 4, wherein the optical intensity information recorded in the optical-intensity-information storage indicates the second control target point.

6. The optical transmitter according to claim 5, wherein during the modulation OFF operation, the bias controller switches the control target point by using the optical intensity information recorded in the optical-intensity-information storage.

7. The optical transmitter according to claim 4, wherein during the modulation ON operation, the optical intensity detection unit generates the optical intensity information by detecting the intensity of the light signal, and transmits the optical intensity information to the optical-intensity-information storage.

8. The optical transmitter according to claim 1, wherein during the modulation OFF operation, the bias controller switches the control target point from the first control target point to the second control target point and executes the feedback control, independently of another optical modulation device.

9. The optical transmitter according to claim 1, wherein the optical modulator is a Mach-Zehnder modulator.

10. The optical transmitter according to claim 1, further comprising a light source configured to output continuous light, wherein the continuous light is input as the input light to the first-stage optical modulation device of the first-stage to the Nth-stage optical modulation devices which are connected in cascade.

* * * * *